(12) United States Patent
Hattori et al.

(10) Patent No.: US 8,791,673 B2
(45) Date of Patent: Jul. 29, 2014

(54) POWER SUPPLY APPARATUS INCLUDING A CAPACITOR AND A CURRENT DETECTOR

(71) Applicant: Murata Manufacturing Co., Ltd., Nagaokakyo (JP)

(72) Inventors: Kazuo Hattori, Nagaokakyo (JP); Isamu Fujimoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 8 days.

(21) Appl. No.: 13/629,754

(22) Filed: Sep. 28, 2012

(65) Prior Publication Data

US 2013/0265025 A1 Oct. 10, 2013

(30) Foreign Application Priority Data

Mar. 30, 2010 (JP) ................................. 2010-078109

(51) Int. Cl.
*G05F 1/00* (2006.01)
(52) U.S. Cl.
USPC .......................................... 323/271; 323/282
(58) Field of Classification Search
CPC ........................................................ G05F 1/46
USPC .................. 323/222–225, 271–275, 282–285
See application file for complete search history.

(56) References Cited

U.S. PATENT DOCUMENTS

| | | | | |
|---|---|---|---|---|
| 4,471,418 A | * | 9/1984 | Tuma | 363/21.07 |
| 5,448,445 A | * | 9/1995 | Yamate et al. | 361/304 |
| 5,528,465 A | * | 6/1996 | Yamate et al. | 361/818 |
| 6,002,577 A | * | 12/1999 | Wada et al. | 361/312 |
| 6,172,888 B1 | * | 1/2001 | Jochi | 363/89 |
| 6,222,709 B1 | * | 4/2001 | Baba | 361/18 |
| 6,316,883 B1 | * | 11/2001 | Cho et al. | 315/247 |
| 6,567,261 B2 | * | 5/2003 | Kanouda et al. | 361/502 |
| 2002/0084871 A1 | * | 7/2002 | Fallahi | 333/168 |
| 2003/0011962 A1 | * | 1/2003 | Yamamoto | 361/321.2 |
| 2003/0042878 A1 | * | 3/2003 | Kanouda et al. | 323/282 |

(Continued)

FOREIGN PATENT DOCUMENTS

| | | |
|---|---|---|
| JP | 03-159206 A | 7/1991 |
| JP | 05-144663 A | 6/1993 |

(Continued)

OTHER PUBLICATIONS

Official Communication issued in International Patent Application No. PCT/JP2011/001854, mailed on Jul. 5, 2011.

*Primary Examiner* — Timothy J Dole
*Assistant Examiner* — Yusef Ahmed
(74) *Attorney, Agent, or Firm* — Keating and Bennett, LLP

(57) ABSTRACT

In a power supply apparatus that supplies direct current power to a load with a power supply unit, since a load power supply current is detected by a current detector from a voltage between both ends of a through electrode of a three-terminal capacitor provided on a power feed line extending from a power supply unit to a load, the three-terminal capacitor serving as a filter to reduce ripple noise can be used also as a detection resistor for detecting the load power supply current. Accordingly, it is possible to detect the load power supply current with a simple configuration that does not require a resistance element to detect the load power supply current, unlike in the related art. Consequently, it is not necessary to ensure an area where the resistance element for current detection can be mounted to reduce a power supply apparatus in size.

20 Claims, 3 Drawing Sheets

(56) References Cited

U.S. PATENT DOCUMENTS

| | | |
|---|---|---|
| 2003/0090237 A1* | 5/2003 | Shenai et al. ............... 320/139 |
| 2003/0090244 A1* | 5/2003 | Shenai et al. ............... 323/259 |
| 2004/0116084 A1* | 6/2004 | Ward et al. .................. 455/130 |
| 2004/0182696 A1* | 9/2004 | Kuriyama et al. ...... 204/298.03 |
| 2005/0007718 A1* | 1/2005 | Stevenson et al. ........... 361/118 |
| 2005/0012200 A1* | 1/2005 | Sawada et al. ............... 257/698 |
| 2005/0107051 A1* | 5/2005 | Aparin et al. ................ 455/126 |
| 2005/0264977 A1 | 12/2005 | Togashi |
| 2006/0164178 A1* | 7/2006 | Matsuura .................... 331/158 |
| 2008/0186652 A1* | 8/2008 | Lee et al. .................. 361/306.3 |
| 2008/0186751 A1* | 8/2008 | Tokuyama et al. ........... 363/131 |
| 2009/0212754 A1* | 8/2009 | Ryan et al. ................... 323/282 |
| 2010/0045714 A1* | 2/2010 | Ishizaki ........................ 347/9 |
| 2010/0046135 A1* | 2/2010 | Niki et al. ................. 361/301.4 |

FOREIGN PATENT DOCUMENTS

| | | |
|---|---|---|
| JP | 2000-078838 A | 3/2000 |
| JP | 2003-282347 A | 10/2003 |
| JP | 2005-086676 A | 3/2005 |
| JP | 2005-347314 A | 12/2005 |
| JP | 2008-172973 A | 7/2008 |

\* cited by examiner

POWER SUPPLY APPARATUS INCLUDING A CAPACITOR AND A CURRENT DETECTOR

BACKGROUND OF THE INVENTION

1. Field of the Invention

The present invention relates to a technology to detect a load power supply current in a power supply apparatus that supplies direct current power to a load with a power supply unit.

2. Description of the Related Art

As shown in FIG. 4, a conventional power supply apparatus 500 includes a transformer 501, a rectification-smoothing circuit 502, a switching element 503, a control integrated circuit (IC) 504, a detection circuit 505, a load current detecting circuit 506, and an overcurrent setting switching circuit 507. See, for example, Japanese Unexamined Patent Application Publication No. 2008-172973, especially paragraphs [0031] to [0041], FIG. 1, etc. In the power supply apparatus 500, the voltage of direct current power supplied from an input terminal to a primary side of the transformer 501 is converted into a certain voltage value by the transformer 501, and a secondary voltage of the transformer 501 is rectified and smoothed by the rectification-smoothing circuit 502 and is supplied from an output terminal to an external load.

A primary current and a primary voltage of the transformer 501 are controlled by switching turning on-off of the switching element 503 by the control IC 504 on the basis of the current (voltage) detected in the detection circuit 505. The power supply apparatus 500 is configured so that the circuit configuration of the detection circuit 505 is switched by the overcurrent setting switching circuit 507 on the basis of a load current detected by the load current detecting circuit 506 to vary a detection voltage to be input into an over current latch (OC) terminal of the control IC 504 in order to switch the setting value for detection of the overcurrent.

Accordingly, since the setting value in the detection of the overcurrent by the detection circuit 505 can be switched by the overcurrent setting switching circuit 507 on the basis of the value of a normal load current detected by the load current detecting circuit 506 including a detection resistor 508, it is possible to detect any overcurrent that occurs even when the load current is much smaller than a rated output current, thereby surely preventing the elements in the power supply apparatus from, for example, being burned out. FIG. 4 is a diagram showing an exemplary power supply apparatus according to the related art.

Electronics including notebook personal computers, mobile phones, mobile audio players, and flat-panel liquid crystal display televisions are increasingly reduced in size in recent years and the power supply apparatuses installed in such electronics are required to be further reduced in size. However, the load current is detected on the basis of a terminal voltage of the detection resistor 508 in the load current detecting circuit 506 and the overcurrent is detected on the basis of a terminal voltage of a detection resistor 509 in the detection circuit 505 in the above technology according to the related art, it is necessary to provide the detection resistors 508 and 509 for current detection and to ensure areas where the detection resistors 508 and 509 can be mounted.

In addition, a technology to detect the load current by using a series parasitic resistance of a smoothing inductor provided on a power feed line as the detection resistor is also known. However, in this case, although it is not necessary to provide the detection resistor, it is necessary to provide components including resistors and capacitors for compensating for the electromotive force based on the inductance, and to ensure areas where such components can be mounted.

SUMMARY OF THE INVENTION

In order to resolve the above problems, preferred embodiments of the present invention provide a technology that detects a load power supply current with a simple configuration.

A power supply apparatus according to a preferred embodiment of the present invention supplying power in the form of direct current to a load with a power supply unit includes a capacitor including a main body, a through electrode arranged so as to penetrate through the main body, and a ground electrode provided on an external surface of the main body, and a current detector that detects a load power supply current, wherein the capacitor is provided on a power feed line extending from the power supply unit to the load so that one end side of the through electrode is connected to the power supply unit side and the other end side of the through electrode is connected to the load side, such that the current detector detects the load power supply current from a voltage between both ends of the through electrode.

The capacitor is preferably a three-terminal capacitor.

In the power supply apparatus described above, it is preferable that the power supply unit includes a switching power supply, and the through electrode is located between the load side of a smoothing inductor in the switching power supply and an output terminal.

The current detector is preferably provided in a control circuit in the power supply unit, and the power supply unit is preferably subjected to feedback control in response to a signal detected by the current detector.

According to a preferred embodiment of the present invention, in the power supply apparatus supplying direct current power to the load with the power supply unit, the capacitor includes the through electrode arranged to penetrate through the main body and the ground electrode provided on an external surface of the main body and is provided on the power feed line extending from the power supply unit to the load so that one end side of the through electrode is connected to the power supply unit side and the other end side of the through electrode is connected to the load side. The load power supply current is detected by the current detector from the voltage between both ends of the through electrode of the capacitor. Accordingly, the capacitor serving as a filter to reduce ripple noise can be used also as a detection resistor to detect the load power supply current, so that it is possible to detect the load power supply current with a simple configuration. In addition, since it is not necessary to provide the resistance element to detect the load power supply current, unlike in the related art, it is not necessary to provide an area where the resistance element for current detection is mounted, thus leading to a significant reduction in size of the apparatus. The removal of the resistance element for current detection also allows the cost to be reduced.

According to a preferred embodiment of the present invention, since the capacitor preferably is a three-terminal capacitor, the through electrode can be provided on the power feed line to provide the three-terminal capacitor with a practical configuration.

The power supply unit preferably includes a switching power supply, and the through electrode is provided between the load side of the smoothing inductor in the switching power supply and the output terminal. Since it is possible to detect the load power supply current without the need to provide a component or element to detect the load power supply current, in addition to the inductor and the capacitor functioning as a smoothing circuit, the power supply apparatus is excellent in practicality.

According to a preferred embodiment of the present invention, since the current detector preferably is provided in the control circuit in the power supply unit and the power supply unit is subjected to feedback control in response to a signal detected by the current detector, it is possible to reliably and stably supply the direct current power to the load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A power supply apparatus according to preferred embodiments of the present invention will herein be described with reference to FIG. 1 to FIG. 2.

Figure 1:
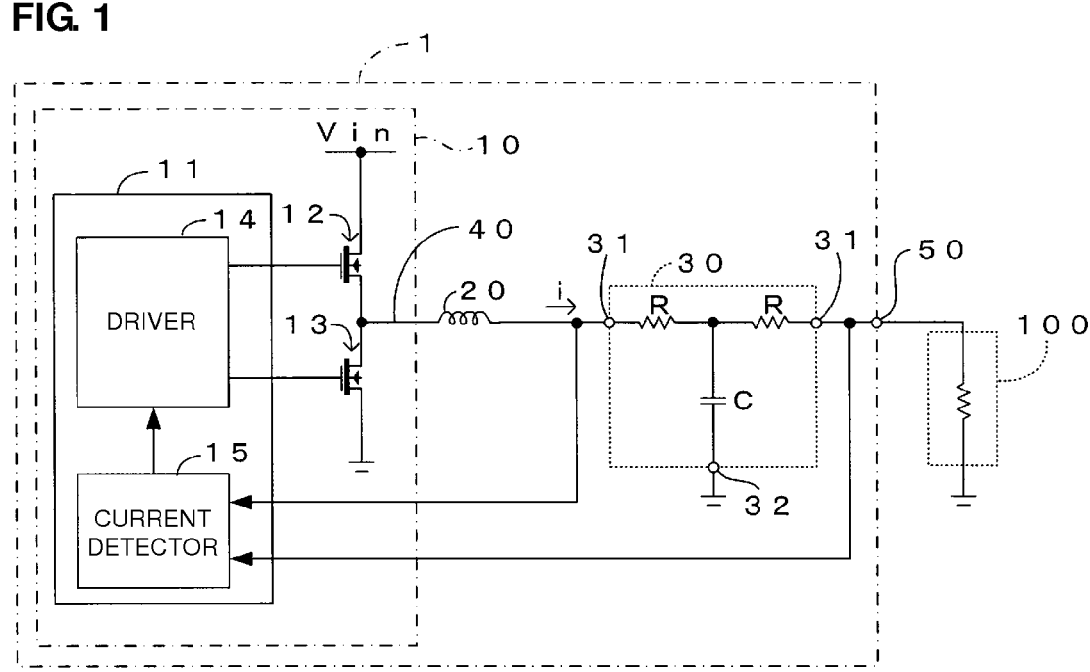
FIG. 1 is a diagram showing an example of a power supply apparatus according to a preferred embodiment of the present invention.

FIG. 1 is a diagram showing an example of a power supply apparatus 1 according to a preferred embodiment of the present invention. FIG. 2 is a diagram showing an example of a three-terminal capacitor 30. As shown in FIG. 1, the power supply apparatus 1 supplies direct current power to a load 100 with a power supply unit 10 and includes the power supply unit 10, an inductor 20, and the three-terminal capacitor 30.

The power supply unit 10 preferably includes a so-called common switching power supply and a control circuit 11, switching elements 12 and 13 each including, for example, a metal oxide semiconductor field effect transistor (MOSFET), and a direct current power supply Vin. The control circuit 11 includes a driver 14 and a current detector 15. The driver 14 switches turning on-off of the switching elements 12 and 13 by pulse width modulation (PWM) drive. The current detector 15 detects a load power supply current i to the load 100 from the voltage between both ends of a through electrode 31 of the three-terminal capacitor 30, described below.

The current detector 15 preferably includes a common differential amplifier or the like. The turning on-off of the switching elements 12 and 13 is switched and controlled by the driver 14 on the basis of a signal detected by the current detector 15 to cause the power supply unit 10 to be subjected to feedback control in response to the signal detected by the current detector 15, and the direct current power is supplied to the load 100 through a power feed line 40.

Although the most common switching power supply is exemplified to describe the power supply unit 10 in the present preferred embodiment, the switching power supply may have any known configuration. Since detailed configurations and operations of the driver 14 and the current detector 15 are known, a description of the detailed configurations and operations thereof is omitted herein.

The inductor 20 and the three-terminal capacitor 30 are provided on the power feed line 40 extending from the power supply unit 10 to the load 100 in order to smooth the power supplied from the power supply unit 10 including the switching power supply. One end of the through electrode 31 of the three-terminal capacitor 30 is connected to the inductor 20 and the other end of the through electrode 31 of the three-terminal capacitor 30 is connected to an output terminal 50.

Figure 2:
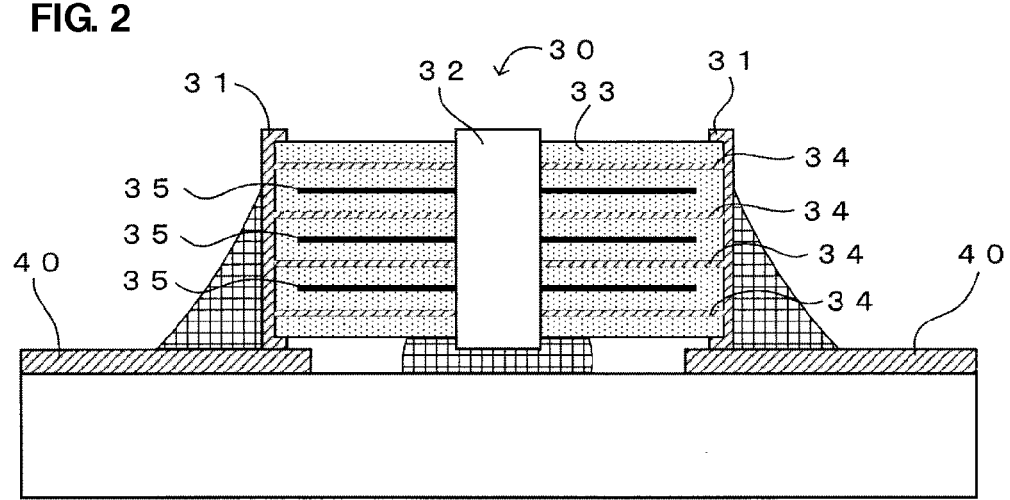
FIG. 2 is a diagram showing an example of a three-terminal capacitor according to a preferred embodiment of the present invention.

As shown in FIG. 2, the three-terminal capacitor 30 of the present preferred embodiment preferably is a so-called chip monolithic ceramic capacitor. Multiple inner through electrodes 34 and multiple internal ground electrodes 35 are provided inside the main body of the three-terminal capacitor 30 so that the inner through electrode 34 opposes the internal ground electrode 35 via ceramic dielectric layers 33. The through electrode 31 and a ground electrode 32 are provided as outer electrodes. The through electrode 31 is connected to both ends of the respective inner through electrodes 34 that externally extend at both ends, and the ground electrode 32 is connected to the respective internal ground electrodes 35 that externally extend.

Providing the three-terminal capacitor 30 in the above manner on the power feed line 40 defines series resistors R between both ends of the through electrode 31 and a capacitor C defined between the through electrode 31 and the ground electrode 32 to define an equivalent circuit shown in FIG. 1.

Next, an example of the operation of the power supply apparatus 1 shown in FIG. 1 will be briefly described. Upon start of power supply to the load 100, the switching element 12 is turned on and the switching element 13 is turned off by the driver 14 and the load power supply current i supplied from the direct current power supply Vin to the load 100 is increased. The voltage between both ends of the through electrode 31 of the three-terminal capacitor 30, detected by the current detector 15, is increased with the increase in the load power supply current i. If the detected voltage is higher than a certain value, the switching element 12 is turned off and the switching element 13 is turned on by the driver 14.

The switching of the turning on-off of the switching elements 12 and 13 by the driver 14 starts discharge from the three-terminal capacitor 30 that is charged to decrease the load power supply current i. The voltage between both ends of the through electrode 31 of the three-terminal capacitor 30, detected by the current detector 15, is decreased with the decrease in the load power supply current i. If the detected voltage is lower than a certain value, the switching element 12 is turned on and the switching element 13 is turned off by the driver 14.

The turning on-off of the switching elements 12 and 13 is sequentially switched by the driver 14 on the basis of the voltage between both ends of the through electrode 31 of the three-terminal capacitor 30, detected by the current detector 15, in the above manner to supply the direct current power to the load 100.

As described above, according to the present preferred embodiment, the load power supply current i is detected by the current detector 15 from the voltage between both ends of the through electrode 31 of the three-terminal capacitor 30 provided on the power feed line 40 extending from the power supply unit 10 to the load 100. Accordingly, the three-terminal capacitor 30 serving as a filter to reduce ripple noise can be used also as a detection resistor to detect the load power supply current i, so that it is possible to detect the load power supply current i with a simple configuration. In addition, since it is not necessary to provide the resistance element to detect the load power supply current i, unlike in the related art, it is not necessary to ensure the space where the resistance element for current detection is mounted to reduce the power supply apparatus 1 in size. The removal of the resistance element for current detection allows the cost to be reduced.

The power supply unit 10 preferably includes a switching power supply and one end of the through electrode 31 of the three-terminal capacitor 30 is connected to the inductor 20 to smooth the switching power supply and the other end of the through electrode 31 of the three-terminal capacitor 30 is connected to the output terminal 50. Since it is possible to detect the load power supply current i with no component being provided to detect the load power supply current i, in addition to the inductor 20 and the three-terminal capacitor 30 functioning as a smoothing circuit, the power supply apparatus 1 is very practical.

Since the current detector 15 is provided in the control circuit 11 in the power supply unit 10 and the power supply unit 10 is subjected to the feedback control with the signal detected by the current detector 15, it is possible to reliably and stably supply the direct current power to the load 100.

The present invention is not limited to the preferred embodiment described above and various modifications can be made within the spirit and scope of the present invention. For example, although the capacitor preferably is a three-terminal capacitor 30 in the above preferred embodiment, capacitors of various configurations including the through electrode 31 may be used as the capacitor, as shown in FIGS. 3A-3D.

Figure 3A:
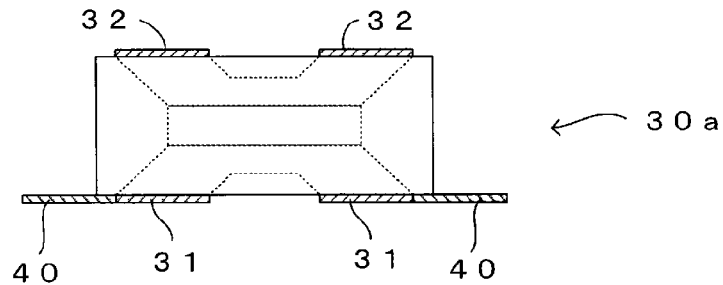
FIGS. 3A to 3D includes diagrams showing other examples of a capacitor according to a preferred embodiment of the present invention.
Figure 3B:
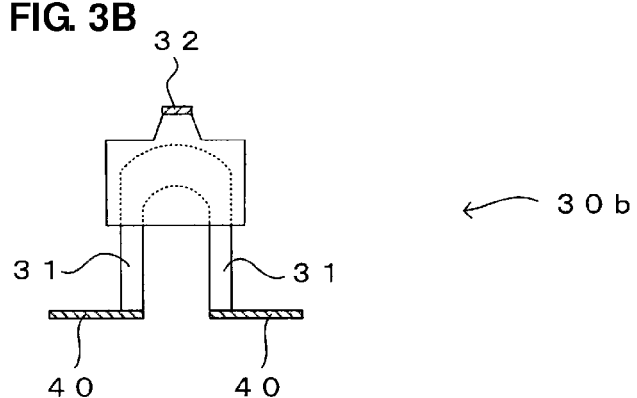
Figure 3C:
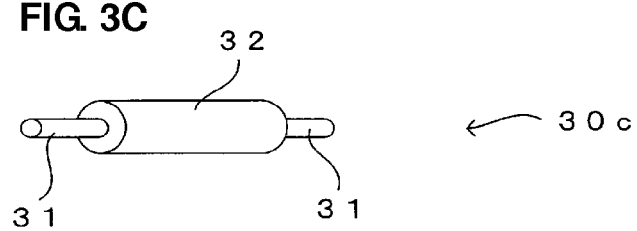
Figure 3D:
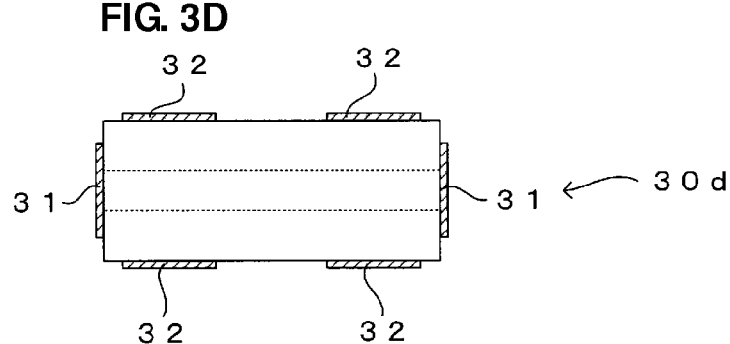
Figure 4:
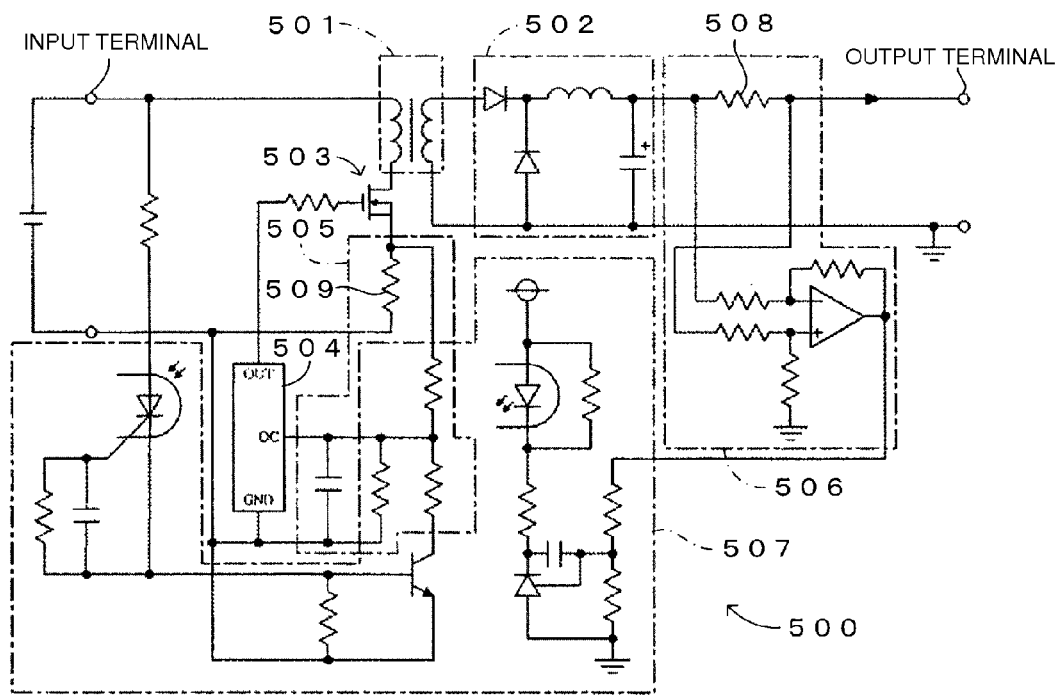
FIG. 4 is a diagram showing an example of a power supply apparatus according to the related art.

FIGS. 3A-3D includes diagrams showing other examples of the capacitor. FIG. 3A shows a four-terminal capacitor 30a, FIG. 3B shows a three-terminal capacitor 30b, which is another example of the three-terminal capacitor 30, FIG. 3C shows a feed-through capacitor 30c, and FIG. 3D shows a six-terminal capacitor 30d. The through electrode 31 included in each of the capacitors 30a to 30d shown in FIG. 3A to 3D is provided on the power feed line 40 to provide each of the capacitors 30a to 30d on the power feed line 40. Although the capacitors 30a and 30d each include multiple ground electrodes 32, the respective ground electrodes 32 may be selectively connected to ground lines at the load 100 side and at the power supply unit 10 side depending on the design of the power supply apparatus 1.

Although the power supply unit 10 preferably includes a switching power supply in the above preferred embodiments, the power supply unit 10 may be another common power supply.

With preferred embodiments of the present invention, it is not necessary to provide the resistance element for current detection even when the voltage between both ends of the inductor 20 is detected by using the series resistance of the inductor 20 to detect the load power supply current i. However, an inductor having an inductance L much larger than that of the resistance element for current detection is generally adopted as the inductor 20 of the power supply apparatus 1 and the load power supply current i flowing through the inductor 20 is increased or decreased by the switching operation of the power supply unit 10. Accordingly, an electromotive force $\Delta V = L \times di/dt$ proportional to the magnitude of the inductance L occurs at both ends of the inductor 20.

Consequently, it is necessary to add a correction circuit to correct the inductance L component including, for example, a resistor and a capacitor in order to accurately detect the load power supply current i. As a result, it is necessary to ensure a space where the components defining the added correction circuit can be provided and the addition of the components causes the disadvantage of increasing the cost. In contrast, since the inductance L component of the through electrode 31 of each of the capacitors 30, 30a, 30b, 30c, and 30d is of the same order of that of the resistance element for current detection in the related art, it is not necessary to provide the above correction circuit and the cost is not increased.

It is preferable to adopt capacitors in which the resistance between both ends of the through electrode 31 is of the order of a few milliohms as the capacitors 30, 30a, 30b, 30c, and 30d. With the above configuration, it is possible to accurately detect the minute load power supply current i via the current detector 15.

Preferred embodiments of the present invention are applicable to various power supply apparatuses installed in electronic apparatuses including notebook personal computers, mobile phones, mobile audio players, and thin-panel liquid crystal display televisions, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply apparatus that supplies direct current power to a load with a power supply unit, the power supply apparatus comprising:
   a capacitor module including a main body that includes a dielectric layer, a through electrode penetrating through the main body, and a ground electrode provided on an external surface of the main body, the through electrode being opposed to the ground electrode via the dielectric layer, and a capacitor is defined between the through electrode and the ground electrode; and
   a current detector arranged to detect a load power supply current; wherein
   the capacitor module is provided on a power feed line extending from the power supply unit to the load so that one end side of the through electrode is connected to the power supply unit side and the other end side of the through electrode is connected to a load side;
   both ends of the through electrode are connected to the current detector; and
   a resistor is defined between both ends of the through electrode and is configured to generate a voltage from which the current detector detects the load power supply current from the voltage between both ends of the through electrode.

2. The power supply apparatus according to claim 1, wherein the capacitor module includes a three-terminal capacitor.

3. The power supply apparatus according to claim 2, wherein the three-terminal capacitor is provided on the power line so as to define the resistors between both ends of the through electrode and the capacitor defined between the through electrode and the ground electrode.

4. The power supply apparatus according to claim 2, wherein the three-terminal capacitor is a chip monolithic ceramic capacitor.

5. The power supply apparatus according to claim 1, wherein the power supply unit includes a switching power supply, and the through electrode is provided between the load side of a smoothing inductor in the switching power supply and an output terminal.

6. The power supply apparatus according to claim 1, wherein the current detector is provided in a control circuit in the power supply unit, and the power supply unit is subjected to feedback control in response to a signal detected by the current detector.

7. The power supply apparatus according to claim 1, wherein the power supply unit includes a common switching power supply and a control circuit.

8. The power supply apparatus according to claim 7, wherein the power supply unit includes switching elements and a direct current power supply.

9. The power supply apparatus according to claim 8, wherein each of the switching elements includes a metal oxide semiconductor field effect transistor.

10. The power supply apparatus according to claim 8, wherein the power supply unit includes a common switching power supply and a control circuit.

11. The power supply apparatus according to claim 10, wherein the control circuit includes a driver and a current detector.

12. The power supply apparatus according to claim 11, wherein the driver switches turning on-off of the switching elements by pulse width modulation.

13. The power supply apparatus according to claim 11, wherein the current detector detects a load power supply current to the load from voltage between both ends of the through electrode of the capacitor module.

14. The power supply apparatus according to claim 11, wherein the current detector includes a common differential amplifier.

15. The power supply apparatus according to claim 11, wherein turning on-off of the switching elements is switched and controlled by the driver based on a signal detected by the current detector to cause the power supply unit to be subjected to feedback control in response to the signal being detected by the current detector.

16. The power supply apparatus according to claim 13, wherein the capacitor module includes a three-terminal capacitor.

17. The power supply apparatus according to claim 1, wherein direct current power is supplied to the load through the power feed line.

18. The power supply apparatus according to claim 1, further comprising an inductor, wherein the capacitor module includes a three-terminal capacitor, and the inductor and the three-terminal capacitor are provided on the power feed line between the power supply unit to the load so as to smooth the power supplied from the power supply unit.

19. The power supply apparatus according to claim 18, wherein the three-terminal capacitor includes the through electrode, and one end of the through electrode is connected to the inductor and the other end of the through electrode is connected to an output terminal.

20. An electronic apparatus comprising:
a power supply apparatus that supplies direct current power to a load with a power supply unit, the power supply apparatus including:
  a capacitor module including a main body that includes a dielectric layer, a through electrode penetrating through the main body, and a ground electrode provided on an external surface of the main body, the through electrode being opposed to the ground electrode via the dielectric layer, and a capacitor is defined between the through electrode and ground electrode; and
  a current detector arranged to detect a load power supply current; wherein
  the capacitor module is provided on a power feed line extending from the power supply unit to the load so that one end side of the through electrode is connected to the power supply unit side and the other end side of the through electrode is connected to a load side;
  both ends of the through electrode are connected to the current detector; and
  a resistor is defined between both ends of the through electrode and is configured to generate a voltage from which the current detector detects the load power supply current from the voltage between both ends of the through electrode.

* * * * *